United States Patent
Zhu

(10) Patent No.: US 8,380,869 B2
(45) Date of Patent: Feb. 19, 2013

(54) METHOD AND DEVICE FOR PROCESSING SIMULTANEOUS MEDIA STREAMS

(75) Inventor: Lei Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 12/790,465

(22) Filed: May 28, 2010

(65) Prior Publication Data

US 2010/0235535 A1    Sep. 16, 2010

Related U.S. Application Data

(63) Continuation of application No. PCT/CN2008/073159, filed on Nov. 21, 2008.

(30) Foreign Application Priority Data

Nov. 30, 2007  (CN) .......................... 2007 1 0194109

(51) Int. Cl.
*G06F 15/16*    (2006.01)
*G06F 12/00*    (2006.01)

(52) U.S. Cl. ....................................................... 709/231

(58) Field of Classification Search .................. 709/203, 709/217–218, 231–233, 250
See application file for complete search history.

(56) References Cited

U.S. PATENT DOCUMENTS

| | | | |
|---|---|---|---|
| 6,925,092 B1 | 8/2005 | Derks et al. | |
| 7,782,875 B2 * | 8/2010 | Mikkola | 370/400 |
| 2006/0268318 A1 * | 11/2006 | Lofthus et al. | 358/1.15 |
| 2006/0277581 A1 * | 12/2006 | Eliyahu et al. | 725/88 |
| 2007/0053361 A1 | 3/2007 | Chen et al. | |
| 2007/0076660 A1 | 4/2007 | Sung et al. | |
| 2007/0091912 A1 * | 4/2007 | Song et al. | 370/417 |
| 2007/0121526 A1 | 5/2007 | Sung et al. | |
| 2007/0218932 A1 | 9/2007 | Sung et al. | |
| 2008/0162713 A1 * | 7/2008 | Bowra et al. | 709/231 |
| 2008/0170563 A1 | 7/2008 | Zhu et al. | |
| 2009/0022072 A1 * | 1/2009 | Zhu et al. | 370/260 |

FOREIGN PATENT DOCUMENTS

| | | |
|---|---|---|
| CN | 1801810 A | 7/2006 |
| CN | 1801810 A | 7/2006 |
| CN | 1925419 A | 3/2007 |
| CN | 101047529 A | 10/2007 |
| CN | 101453700 A | 6/2009 |
| WO | WO 01/30045 A1 | 4/2001 |
| WO | WO 2006/094717 A1 | 9/2006 |
| WO | WO 2006/108379 A1 | 10/2006 |
| WO | WO 2007/037644 A1 | 4/2007 |
| WO | WO 2007/058468 A1 | 5/2007 |
| WO | WO 2007/091207 A1 | 8/2007 |
| WO | WO 2007/100218 A1 | 9/2007 |

OTHER PUBLICATIONS

Chinese Office Action for application No. 2007101941093, dated Jan. 8, 2010, 20 pages.

(Continued)

*Primary Examiner* — Zarni Maung
(74) *Attorney, Agent, or Firm* — Slater & Matsil, L.L.P.

(57) ABSTRACT

A method for processing simultaneous media streams includes receiving an indication at a user terminal. The indication is related to a manner for processing simultaneous media streams. The user terminal processes the simultaneous media streams according to the indication when receiving the simultaneous media streams.

16 Claims, 10 Drawing Sheets

OTHER PUBLICATIONS

Cooper, D., "Requirements relating to simultaneous media," OMA-POC-POCV2_1-2007-0026-INP_simultaneous_media, 2006 Open Mobile Alliance Ltd., Oct. 10, 2007, 11 pages.

International Search Report, International application No. PCT/CN2008/073159, Date of mailing of the international search report Feb. 5, 2009, 4 pages.

Chinese Office Action and Translation received in Chinese Application No. 2007101941093, mailed Oct. 3, 2010, 20 pages.

Written Opinion of the International Searching Authority received in Patent Cooperatin Treaty Application No. PCT/CN2008/073159, mailed Feb. 5, 2009, 4 pages.

"Requirements relating to simultaneous media", OMA-POC-POCV2_1-2007-0026-INP_simultaneous_media, Oct. 10, 2007, Vancouver, 11 pages.

* cited by examiner

METHOD AND DEVICE FOR PROCESSING SIMULTANEOUS MEDIA STREAMS

This application is a continuation of co-pending International Application No. PCT/CN2008/073159, filed Nov. 21, 2008, which designated the United States and was not published in English, and which claims priority to Chinese Application No. 200710194109.3 filed Nov. 30, 2007, both of which applications are incorporated herein by reference.

TECHNICAL FIELD

The present invention relates to a network technology, and in particular, to a method and device for processing simultaneous media streams.

BACKGROUND

With the development of technologies, rich types of media are introduced in the Session Initiation Protocol (SIP) and IP multimedia subsystem (IMS)-based multiparty communication systems. In a multimedia session, the network device or server may strictly restrict the media type. For example, in an ongoing session, only one voice stream and one video stream can be used. In this case, the network entity may judge the requested media type and media parameter in the session request.

In some scenarios, network device providers or operators may allow different media streams of the same media type to be used in a session. In this way, multiple voice streams or multiple video streams may be simultaneously sent to a user terminal in the session.

The possible causes are, on the one hand, network entities that perform certain functions in the session do not provide related media restriction functions, and thus multiple media streams of the same media type requested by the user can be used in the session; on the other hand, in some scenarios, for example, in a multilingual simultaneous interpretation system, multiple simultaneous interpretations use different voice streams in the session.

During the implementation of the present invention, the inventor discovers at least the following problems in the prior art.

In a multiparty communication system, especially in a push-to-talk over cellular client (PoC) service, it is not specified that the created session should use a fixed media type in a multimedia session and that only one media stream of a media type can be sent. In the prior art, multiple media streams of the same media type may be simultaneously sent to the user terminal. Generally, the user cannot normally use the multimedia session in multiple voice streams or multiple video streams. Thus, a processing manner is required for a server to filter the media streams or for a terminal to process the media streams. Because different types of media and media parameters may be used in different sessions and each session may involve different scenarios, a mechanism for processing or filtering media streams by the terminal or the server is required.

SUMMARY OF THE INVENTION

Embodiments of the present invention provide a method and device for processing simultaneous media streams, so that a user can normally use multimedia sessions in multiple voice streams or video streams when multiple media streams are simultaneously sent to a user terminal.

To achieve the above objective, a method for processing simultaneous media streams in an embodiment of the present invention includes a user terminal that receives an indication on a manner for processing simultaneous media streams. Multiple simultaneous media streams are processed according to the indication, when receiving the multiple simultaneous media streams.

Another method for processing simultaneous media streams in an embodiment of the present invention includes receiving a session message from a user terminal, and obtaining an indication on a manner for processing simultaneous media streams related to a session specified by the session message. The indication is sent in a manner for processing simultaneous media streams to the user terminal.

Another method for processing simultaneous media streams in an embodiment of the present invention includes a network that obtaining an indication on a manner for processing simultaneous media streams when receiving multiple media streams simultaneously sent to a user terminal. The media streams are processed according to the indication, and the processed multimedia streams are sent to the user terminal.

A user terminal provided in an embodiment of the present invention is adapted to process simultaneous media streams and includes a terminal processing indication obtaining unit adapted to obtain an indication on a manner for processing simultaneous media streams. A terminal simultaneous media streams processing unit is adapted to process multiple simultaneous media streams according to the indication obtained by the terminal processing indication obtaining unit when receiving the multiple simultaneous media streams.

A network device provided in an embodiment of the present invention is adapted to process simultaneous media streams and includes a processing indication obtaining unit adapted to receive a session message from a user terminal, and obtain an indication on a manner for processing simultaneous media streams related to a session specified by the session message. A processing indication sending unit is adapted to send the indication on a manner for processing simultaneous media streams obtained by the processing indication obtaining unit to the user terminal.

A network device provided in an embodiment of the present invention is adapted to process simultaneous media streams and includes a processing indication obtaining unit adapted to obtain an indication on a manner for processing simultaneous media streams when receiving multiple media streams simultaneously sent to a user terminal. A simultaneous media streams processing unit is adapted to process the media streams according to the indication obtained by the processing indication obtaining unit and send the processed media streams to the user terminal.

Compared with the prior art, embodiments of the present invention have the following merits. A method for processing simultaneous media streams is provided, so that a user terminal or a server can process multiple media streams after receiving the multiple media streams of the same media type. When a user terminal processes the media streams, the user terminal may modify the processing manner according to the user's requirement, without depending on the network entity and with few impacts on the network. The processing manner of the network entity can greatly reduce traffic on the air interface on mobile networks, thus reserving a large quantity of network resources.

DETAILED DESCRIPTION OF ILLUSTRATIVE EMBODIMENTS

The present invention is hereinafter described in detail with reference to the accompanying drawings and exemplary embodiments.

A method for processing simultaneous media streams is provided in embodiments of the present invention. When a user terminal or a network receives multiple media streams of the same media type, the user terminal or the network processes these media streams by using a certain processing manner. The following describes the methods for processing simultaneous media streams by the user terminal and the network each.

The first embodiment of the present invention provides a method for processing simultaneous media streams by the user terminal. The following describes possible methods for processing simultaneous media streams by the user terminal before describing specific processes.

If more than one same media type is used in a multiparty session, that is, if multiple simultaneous media streams are of the same media type, the user terminal receives multiple media streams of more than one same media type at the same time. For example, in a simultaneous interpretation session, a user may receive voice streams in two different languages because the voice streams are not filtered by the network device. In another example, in a PoC service of the Open Mobile Alliance (OMA), more than one voice stream or more than one video stream may be negotiated in a created PoC session. In this case, the user terminal may process multiple media streams of the same media type by using the following processing manners.

(1) The user terminal filters one or multiple media streams of the same media type.

Figure 1:
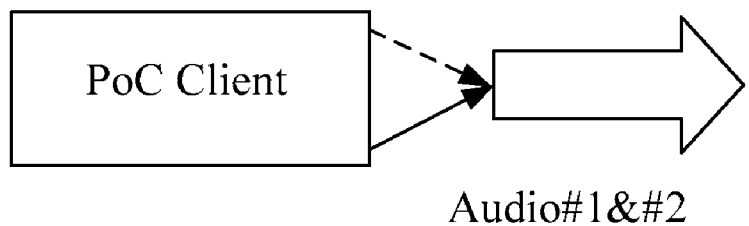
FIG. 1 is a schematic diagram illustrating how a user terminal filters multiple media streams of the same media type in a first embodiment of the present invention.

For example, the user terminal may filter a voice stream but play another voice stream to the user, as shown in FIG. 1.

In this embodiment, this processing manner is called media_type #x handle, where the media_type indicates a media type; the symbol #x indicates IDs of multiple media streams of the same media type and is used to differentiate and identify a media stream; and the handle indicates the method for processing a media stream. Certainly, the processing of media streams of a media type may also be identified by a processing manner ID, or the primary/secondary relationship or priority relationship of a media stream of a media type may be specified to indicate the manner for the user terminal to process the media stream.

(2) The user terminal directly mixes multiple media streams of the same media type.

Figure 2:
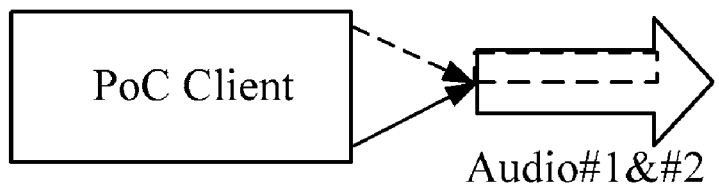
FIG. 2 is a schematic diagram illustrating how the user terminal mixes multiple media streams of the same media type directly in the first embodiment of the present invention.

For example, after two voice streams are mixed, the user terminal plays the mixed voice streams to the user, as shown in FIG. 2.

(3) The user terminal mixes multiple media streams of the same media type according to a ratio.

Figure 3:
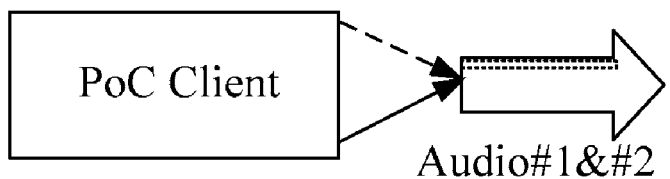
FIG. 3 is a schematic diagram illustrating how the user terminal mixes multiple media streams of the same media type according to a ratio in the first embodiment of the present invention.

For example, after two voice streams are mixed, the user terminal plays the mixed streams, but uses the voice of one voice stream as the background and turns down the volume of the voice stream. In this case, the user may hear a clear voice and a low voice that is used as the background, as shown in FIG. 3. In this embodiment, one media stream is played as the primary media stream, and another media stream of the same media type is used as the background or is played as the secondary media stream. A processing manner may be defined to specify a media stream as the primary media stream or one or multiple media streams as the secondary media streams. The processing manner in which multiple media streams are mixed but the primary and secondary media streams must be differentiated may be identified by using a pre-agreed ID. The specific identification method is not limited, including but not limited to the use of the media processing manner ID mentioned in the first processing manner, for example, media_type #x handle.

The preceding three processing manners are identified by using certain identification methods. These identification methods may be used by the user terminal to process multiple media streams of the same media type.

The following describes the method for processing multiple simultaneous media streams by the user terminal with reference to specific scenarios. The following processing manners are available according to different indication methods for processing multiple simultaneous media streams.

(1) The user terminal negotiates a method for processing multiple media streams of the same media type during the session creation.

Figure 4:
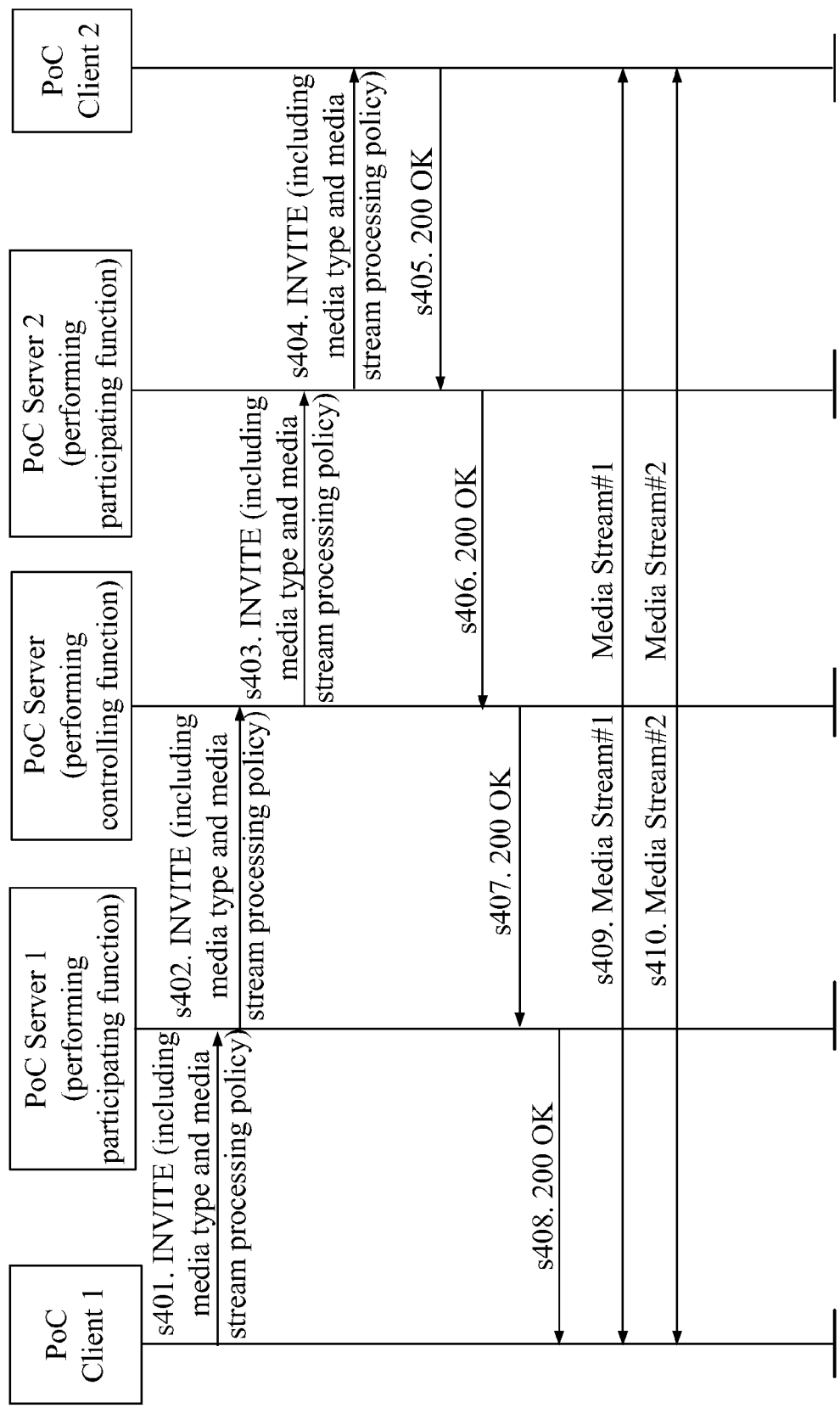
FIG. 4 is a flowchart of a method for the user terminal to indicate a manner for processing simultaneous media streams in a created session in the first embodiment of the present invention.

In the phase of creating a multiparty session, the user terminal initiating the session may add an indication on a manner for processing multiple media streams of the same media type to a session invitation request (INVITE) with the permission of the user who initiates the session. After other user terminals receive the indication, the user terminal plays related media streams to the user according to the indication. As shown in FIG. 4, the process includes the following steps.

Step s401: A first PoC user terminal (PoC Client 1) sends a session invitation request that may carry media parameters (media type and coding parameter) that the user terminal wants to use to join a PoC session and an indication on a manner for processing multiple media streams of the same media type. The indicated manner includes filtering, direct mixing or proportional mixing according to specific rules. For example, these rules may be used to indicate that media stream 1 of the audio type is filtered and media stream 2 of the video type is not filtered when multiple media streams are sent simultaneously.

Step s402: After receiving the session invitation request, a first PoC Server performing participating function (PoC Server 1) forwards the session invitation request to a PoC Server performing controlling function (PoC Server). If the PoC Server rejects the indication on a manner for processing multiple media streams of the same media type that PoC Client 1 carries in the request, the PoC Server may return a 4xx response that carries a reject cause value, for example, Processing Manner Rejected.

Step s403: After receiving the session invitation request, the PoC Server may obtain a list of other members in the session and the indication on a manner for processing multiple media streams of the same media type in the current session. The PoC Server sends a session invitation request to a second PoC Server performing participating function (PoC Server 2) to which the called second PoC user terminal (PoC Client 2) belongs. The session invitation request carries the media parameters and indication on a manner for processing multiple media streams of the same media type.

Step s404: After receiving the session invitation request from the PoC server, PoC Server 2 forwards the session invitation request to PoC Client 2. In this case, PoC Client 2 obtains the information about the manner for processing multiple media streams of the same media type. If PoC Client 2 rejects the indication on a manner for processing multiple media streams of the same media type in the session invitation request, PoC Client 2 may return a 4xx response that carries a reject cause value, for example, Processing Manner Rejected.

Step s405: After receiving the session invitation request, PoC Client 2 judges whether to join the PoC group session, accepts the selected media parameters and the indication on a manner for processing multiple media streams of the same media type, and sends a 200 OK response indicating the successful acceptance of the session invitation request.

Step s406: After receiving the 200 OK response from PoC Client 2, PoC Server 2 forwards the 200 OK response to the PoC Server.

The 200 OK response in step s405 to step s406 may or may not carry the indication on a manner for processing multiple media streams of the same media type, without affecting the process.

Step s407: After receiving the 200 OK response, the PoC Server may send a 200 OK response to PoC Server 1 to which PoC Client 1 belongs. The 200 OK response may carry media parameters selected in the current session and an indication on a manner for processing multiple media streams of the same media type.

Step s408: After receiving the 200 OK response, PoC Server 1 forwards the 200 OK response to PoC Client 1. In this case, PoC Client 1 obtains the information about the manner for processing multiple media streams of the same media type in the current session.

The 200 OK response in step s407 to step s408 may not carry the indication on a manner for processing multiple media streams of the same media type, without affecting the process. If the 200 OK response carries the indication on a manner for processing multiple media streams of the same media type, PoC Client 1 may confirm whether the indication is accepted.

Step s409 to step s410: The PoC Server sends media stream 1 and media stream 2 of the same media type in the session. PoC Server 1 and PoC Server 2 receive stream 1 and media stream 2 of the same media type, and send media stream 1 and media stream 2 to PoC Client 1 and PoC Client 2. The media stream may be originated from any terminal, and is sent to the PoC Server through PoC Server 1 and PoC Server 2.

Then, the user terminal plays the media to the PoC user according to the indication on a manner for processing multiple media streams of the same media type received during the signaling process.

(2) The user terminal negotiates a manner for processing multiple media streams of the same media type during the creation of a pre-arranged group session.

Figure 5:
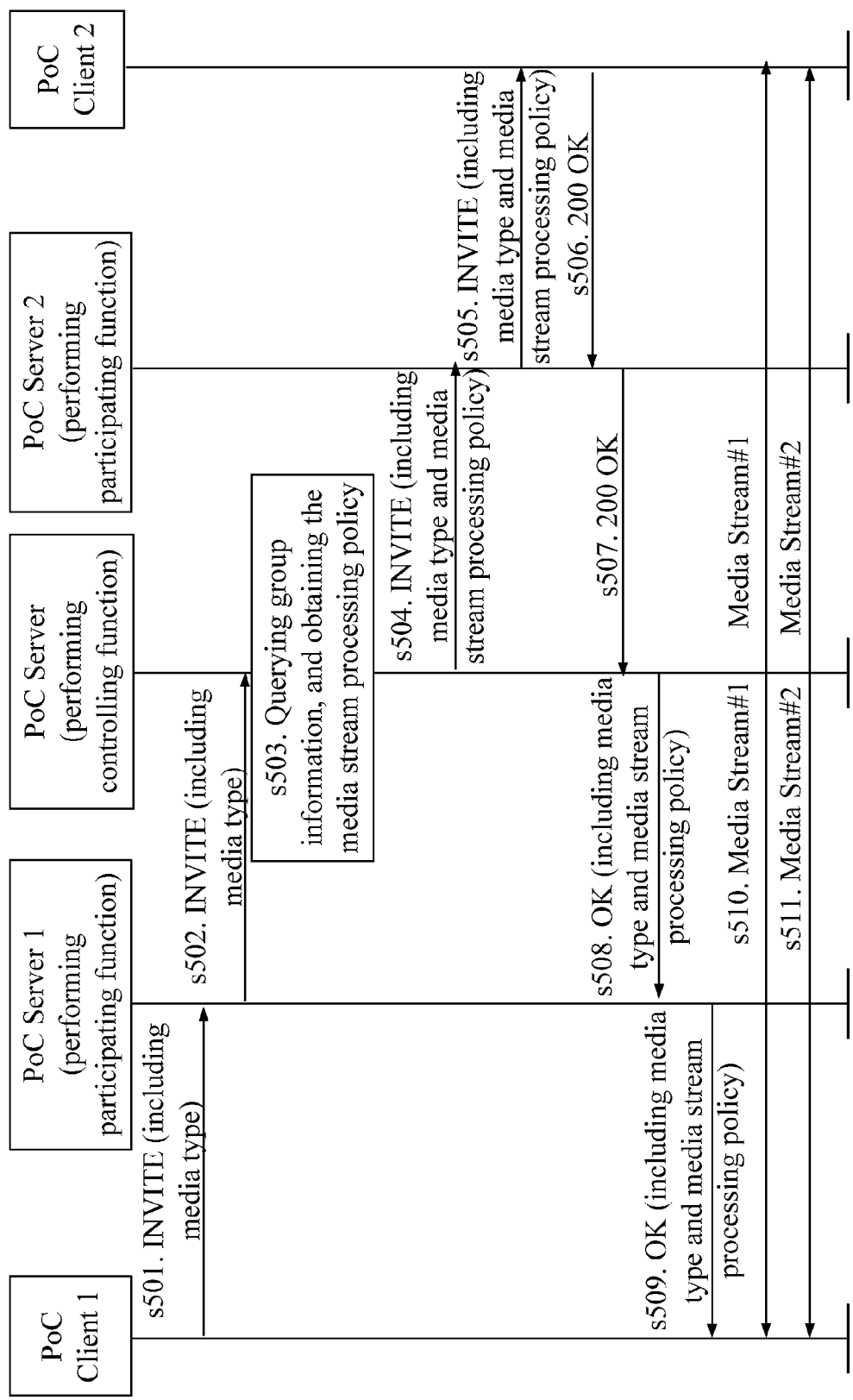
FIG. 5 is a flowchart of a method for the user terminal to indicate a manner for processing simultaneous media streams in a pre-arranged group session in the first embodiment of the present invention.

In the pre-arranged group session, the indication on a manner for processing multiple media streams of the same media type may be included in the group information. In the session creation phase, the indication on a manner for processing media streams may be sent to the user terminal. The following embodiment describes a method for the user terminal to indicate a manner for processing multiple media streams of the same media type by using an indication stored in the group information in the pre-arranged group session. As shown in FIG. 5, the method includes the following steps.

Step s501: PoC Client 1 initiates a pre-arranged group session invitation request that may carry media parameters (including media type and coding parameter) that the user terminal wants to use to join a PoC session.

Step s502: After receiving the session invitation request, PoC Server 1 forwards the session invitation request to the PoC Server.

Step s503: After receiving the session invitation request, the PoC Server queries and obtains a list of pre-arranged group members and group attribute information, including an indication on a manner for processing multiple media streams of the same media type in the attributes of the current PoC group session.

Step s504: After obtaining the list of group members, the PoC Server sends a session invitation request to PoC Server 2 to which PoC Client 2 belongs. The session invitation request includes media parameters and the indication on a manner for processing multiple media streams of the same media type.

Step s505: After receiving the session invitation request from the PoC Server, PoC Server 2 forwards the session invitation request to PoC Client 2. In this case, PoC Client 2 obtains the indication on a manner for processing multiple media streams of the same media type.

Step s506: PoC Client 2 receives the session invitation request, and judges whether to join the PoC group session. If determining to join the session and accept the selected media parameters and the indication on a manner for processing multiple media streams of the same media type, PoC Client 2 sends a 200 OK response indicating the successful acceptance of the session invitation request. If rejecting the indication on a manner for processing multiple media streams of the same media type that PoC Client 1 carries in the session invitation request, PoC Client 2 may return a 4xx response that carries a reject cause value, for example, Processing Manner Rejected.

Step s507: After receiving the 200 OK response from PoC Client 2, PoC Server 2 forwards the 200 OK response to the PoC Server.

The 200 OK response in step s506 to step s507 may not carry the indication on a manner for processing multiple media streams of the same media type, without affecting the process.

Step s508: After receiving the 200 OK response, the PoC Server may send a 200 OK response to PoC Server 1 to which PoC Client 1 belongs. The 200 OK response includes selected media parameters and an indication on a manner for processing multiple media streams of the same media type.

Step s509: After receiving the 200 OK response, PoC Server 1 forwards the 200 OK response to PoC Client 1. In this case, PoC Client 1 obtains the information about the manner for processing multiple media streams of the same media type.

The 200 OK response in step s508 to step s509 should carry the indication on a manner for processing multiple media streams of the same media type, so that PoC Client 1 may obtain the indication on a manner for processing multiple media streams of the same media type in the attributes of the PoC group session on the network.

Step s510 to step s511: The PoC Server sends media stream 1 and media stream 2 of the same media type to PoC Server 1 and PoC Server 2. PoC Server 1 and PoC Server 2 receive media stream 1 and media stream 2 of the same media type, and send media stream 1 and media stream 2 to PoC Client 1 and PoC Client 2.

Then, the user terminal plays the media to the PoC user according to the indication on a manner for processing multiple media streams of the same media type received during the signaling process.

After receiving the indication on a manner for processing multiple media streams of the same media type, the PoC Client may modify the manner for processing multiple media streams of the same media type on the terminal to meet the user's requirement for processing multiple media streams of the same media type in the current session.

(3) Obtaining an indication on a manner for processing multiple media streams of the same media type in a chat group session.

In a chat group session, the chat group session may not be initiated by the user terminal. The session participant may join the chat group session by using a method for joining the session. In the attributes of the chat group session, the media type of the current chat group session may be pre-arranged. The attributes of the chat group session may be stored in policy storage entities. These policy storage entities may be local policy entities on the server that maintains and controls the chat group, or be a server (for example, OMA XDMS) storing the attributes of the chat group or policy specified by an OMA service engine (for example, OMA PoC, OMA IM, and OMA CPM).

In this embodiment, it is specified in the attributes of the chat group session that indication IDs are added to multiple media streams of the same media type. These indication IDs are used to identify the manner for processing multiple media streams of the same media type by the user terminal in the current chat group session.

In addition, the authorized user terminal may modify the current manner for processing multiple media streams of the same media type in the chat group session.

The following describes an example of the indication on a manner for processing multiple media streams of the same media type specified in the chat group session. The OMA PoC service specifications specify scenarios for the PoC chat group session. The chat group predefines group members. In addition, other users do not need to be invited to join the current chat group session when the chat group session is created. Thus, the chat group session is an inherent group session. This session user uses the chat group session by joining the session. The group information of the chat group session does not define the list of group members. However, the attributes of the chat group session in the group information may still specify the attributes of the chat group session, for example, the maximal number of participants, name of the group session, access rule, quality of experience (QoE), and media burst control scheme.

The attributes of the chat group session may further include an indication on a manner for processing multiple media streams of the same media type by the user terminal. The specific processing manner includes but is not limited to the preceding several terminal processing manners. The indication in the group information may be identified by the IDs of the preceding several terminal processing manners.

Figure 6:
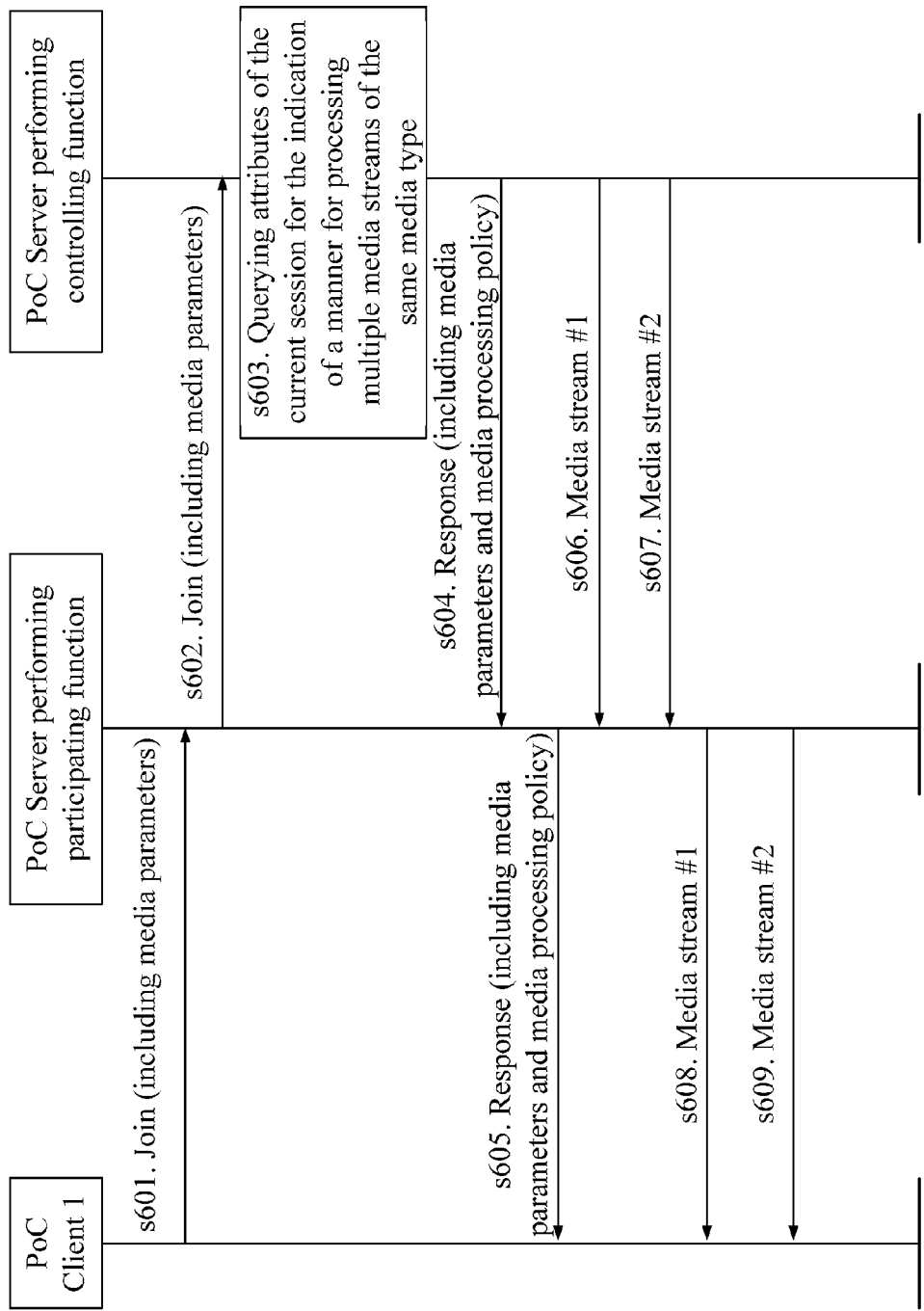
FIG. 6 is a flowchart of sending attribute information of a manner for processing multiple media streams of the same media type to the user terminal during the chat group session in the first embodiment of the present invention.

The following describes a process of sending the indication on a manner for processing multiple media streams of the same media type to the user terminal in a chat group session. As shown in FIG. 6, the process includes the following steps.

Step s601: The PoC Client initiates a request for joining the current PoC chat group session. The request may carry media parameters (including media type and coding parameter) that the user terminal wants to use to join the PoC chat group session.

Step s602: After receiving the join request, the PoC Server performing participating function forwards the join request to the PoC Server performing controlling function.

Step s603: After receiving the join request, the PoC Server performing controlling function may judge whether to allow the user terminal to join the current session, and may query the attributes of the current PoC chat group session for the indication on a manner for processing multiple media streams of the same media type.

Step s604: The PoC Server performing controlling function sends a response indicating that the user terminal joins the PoC chat group session successfully, where the response carries an indication on a manner for processing multiple media streams of the same media type.

Step s605: After receiving the response indicating that the user terminal joins the PoC chat group session successfully, the PoC Server performing participating function forwards the response to the PoC Client.

Step s606 to step s607: During the session, the PoC Server performing controlling function sends media stream 1 and media stream 2 of the same media type to the PoC Server performing participating function.

Step s608 to step s609: The PoC Server performing participating function receives media stream 1 and media stream 2 of the same media type, and sends received media stream 1 and media stream 2 to the PoC Client.

Then, the user terminal plays the media to the PoC user according to the indication on a manner for processing multiple media streams of the same media type received during the signaling process in step s604.

After receiving the indication on a manner for processing multiple media streams of the same media type, the PoC Client may modify the manner for processing multiple media streams of the same media type on the terminal to meet the user's requirement for processing multiple media streams of the same media type in the current session.

Figure 7:
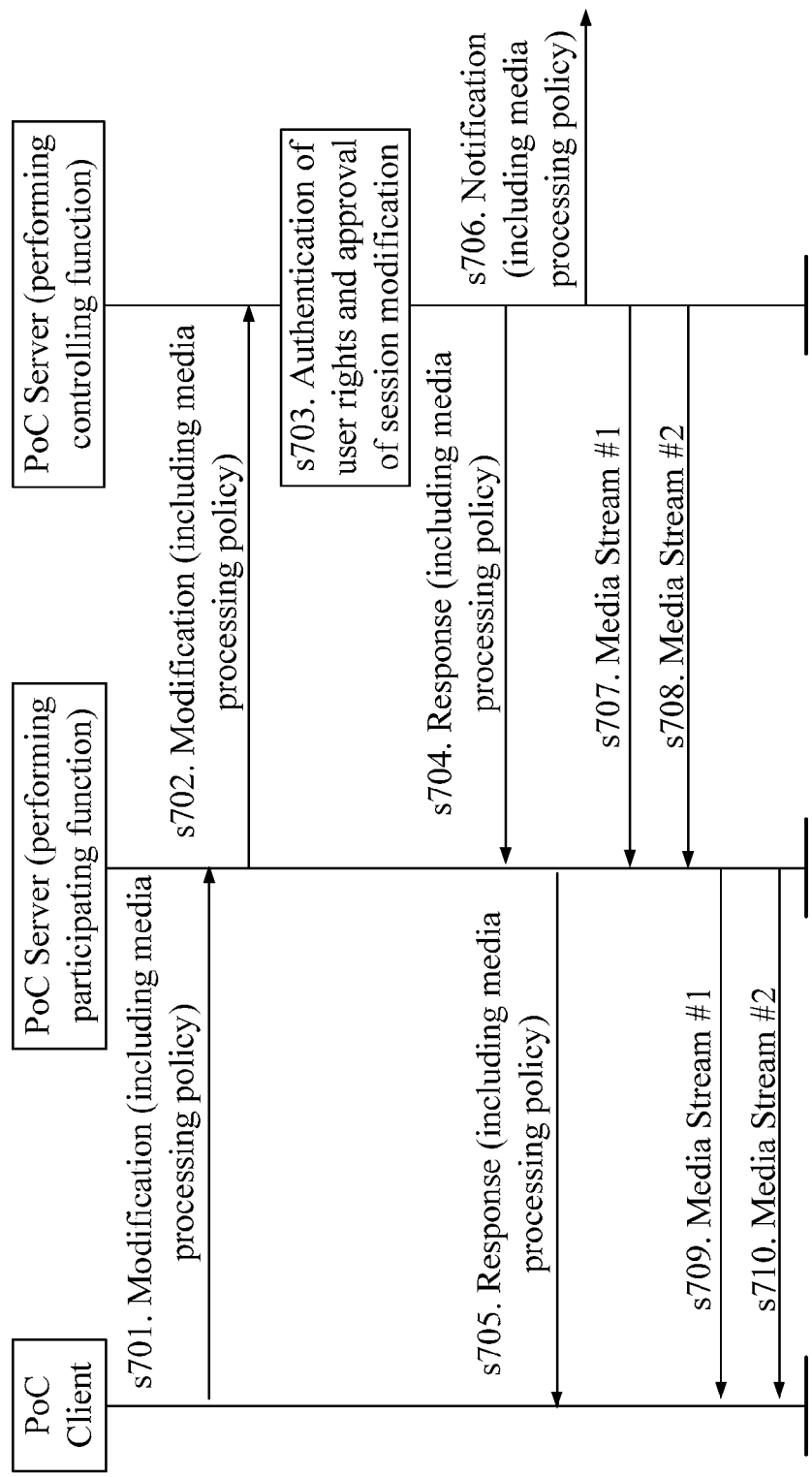
FIG. 7 is a flowchart of modifying attributes in the session by the user terminal during the chat group session in the first embodiment of the present invention.

FIG. 7 illustrates a process of modifying the attributes of the session by the PoC Client. The process includes the following steps.

Step s701: In the PoC chat group session, the PoC Client initiates a session modification request to the PoC Server performing participating function, requesting modification to some attributes of the session, such as the media parameters and media stream processing manner.

Step s702: After receiving the session modification request, the PoC Server performing participating function forwards the session modification request to the PoC Server performing controlling function.

Step s703: After receiving the session modification request, the PoC Server performing controlling function judges whether to accept the session modification request from the user terminal according to user rights. If the session modification request is accepted, the PoC Server performing controlling function modifies the attributes of the session.

Step s704: The PoC Server performing controlling function sends a response indicating that the user terminal modifies the attributes of the PoC chat group session successfully, where the response carries the indication on a manner for processing multiple media streams of the same media type. If rejecting the indication on a manner for processing multiple media streams of the same media type carried in the request, the PoC Server performing controlling function may return a 4xx response that carries a reject cause value, for example, Processing Manner Rejected.

Step s705: After receiving the response indicating that the user terminal modifies the attributes of the PoC chat group session successfully, the PoC Server performing participating function forwards the response to the PoC Client.

Step s706: The PoC Server performing controlling function sends a notification message according to a Subscription/Notification process of the PoC chat group session, where the notification message may be SIP NOTIFICATION.

The PoC Server performing controlling function may initiate a session modification process to the PoC Client, that is, the network server proactively initiates a session modification process. The session modification request carries an indication on a manner for processing media streams of the same media type.

It should be noted that after the manner for processing media streams of the same media type in the session is changed, the session state Subscription/Notification process may be used to notify the PoC Client. The PoC Client notifies the PoC user of the processing manner indication for selection. If the user accepts the processing manner, the processing manner of the user terminal is modified; if the user does not accept the processing manner, the processing manner of the user terminal is not modified. The user terminal may directly accept or reject the modification of the processing manner without displaying the processing manner indication to the user.

After the manner for processing media streams of the same media type in the session is changed and notified to the PoC Client by using the session modification process (Invite, re-Invite or Update), the session modification request carries the indication on a manner for processing media streams of the same media type. The PoC Client notifies the PoC user of the processing manner indication for selection. If the user accepts the processing manner, the processing manner of the user terminal is modified, and a 2xx success response is returned; otherwise, the processing manner of the user terminal is not modified, and a 4xx reject message is returned. The user terminal may directly accept or reject the modification of the processing manner and return a success response or a reject response without displaying the processing manner indication to the user. The user terminal needs to send a response to the network upon acceptance or rejection. This is different from the preceding method for notifying the PoC Client by using the Subscription/Notification process.

Step s707 to step s708: During the session, the PoC Server performing controlling function sends media stream 1 and media stream 2 of the same media type to the PoC Server performing participating function.

Step s709 to step s710: The PoC Server performing participating function receives media stream 1 and media stream 2 of the same media type, and sends received media stream 1 and media stream 2 to the PoC Client.

Then, the user terminal plays the media to the PoC user according to the indication on a manner for processing multiple media streams of the same media type received during the signaling process (in the response).

The second embodiment of the present invention provides a manner for processing simultaneous media streams by a network entity. The following describes possible manners for processing simultaneous media streams by the network before describing the specific process. When the network entity processes multiple media streams of the same media type, the following processing manners are available.

(1) The network entity filters one or multiple media streams of the same media type.

Figure 8:
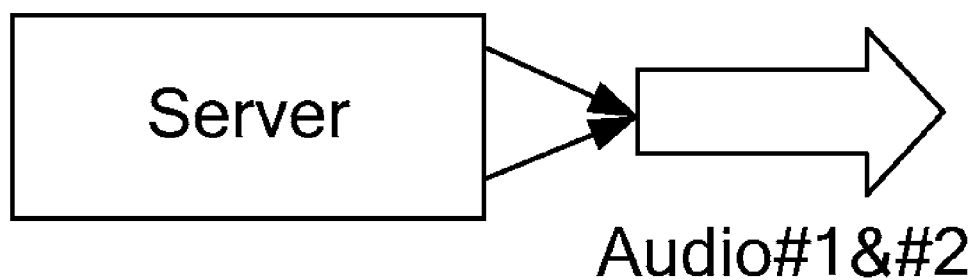
FIG. 8 is a schematic diagram illustrating how a network entity processes media streams in a second embodiment of the present invention.

For example, one voice stream may be filtered, while the other voice stream may be played to the user. In an OMA PoC service, the network entity filtering media streams may be the PoC Server performing participating function, as shown in FIG. 8.

In this embodiment, this processing manner is called media_type #x handle, where the media_type indicates a media type; the symbol #x indicates IDs of multiple media streams of the same media type and is used to differentiate and identify a media stream; and the handle indicates the manner for processing a media stream.

Certainly, the processing of media streams of a media type may also be identified by a processing manner ID, or the primary/secondary relationship or priority relationship of a media stream of a media type may be specified to indicate the manner for the network entity to process media stream. This manner for processing media streams by the network entity may be implemented by using the media parameters specified in the SDP protocol. For example, a media stream may be set to execute the hold mode under certain conditions.

(2) The network entity directly mixes multiple media streams of the same media type.

For example, the network entity mixes two voice streams directly.

(3) The network entity directly mixes multiple media streams of the same media type according to a ratio.

For example, the network entity mixes the two voice streams, but uses one voice stream as the background and lowers the volume of the voice stream. In this case, the user may hear a clear voice and another low voice that is used as the background.

The following describes the method for processing multiple simultaneous media streams by the network entity with reference to specific scenarios. The following processing methods are available according to different indication methods for processing multiple simultaneous media streams.

Figure 9:
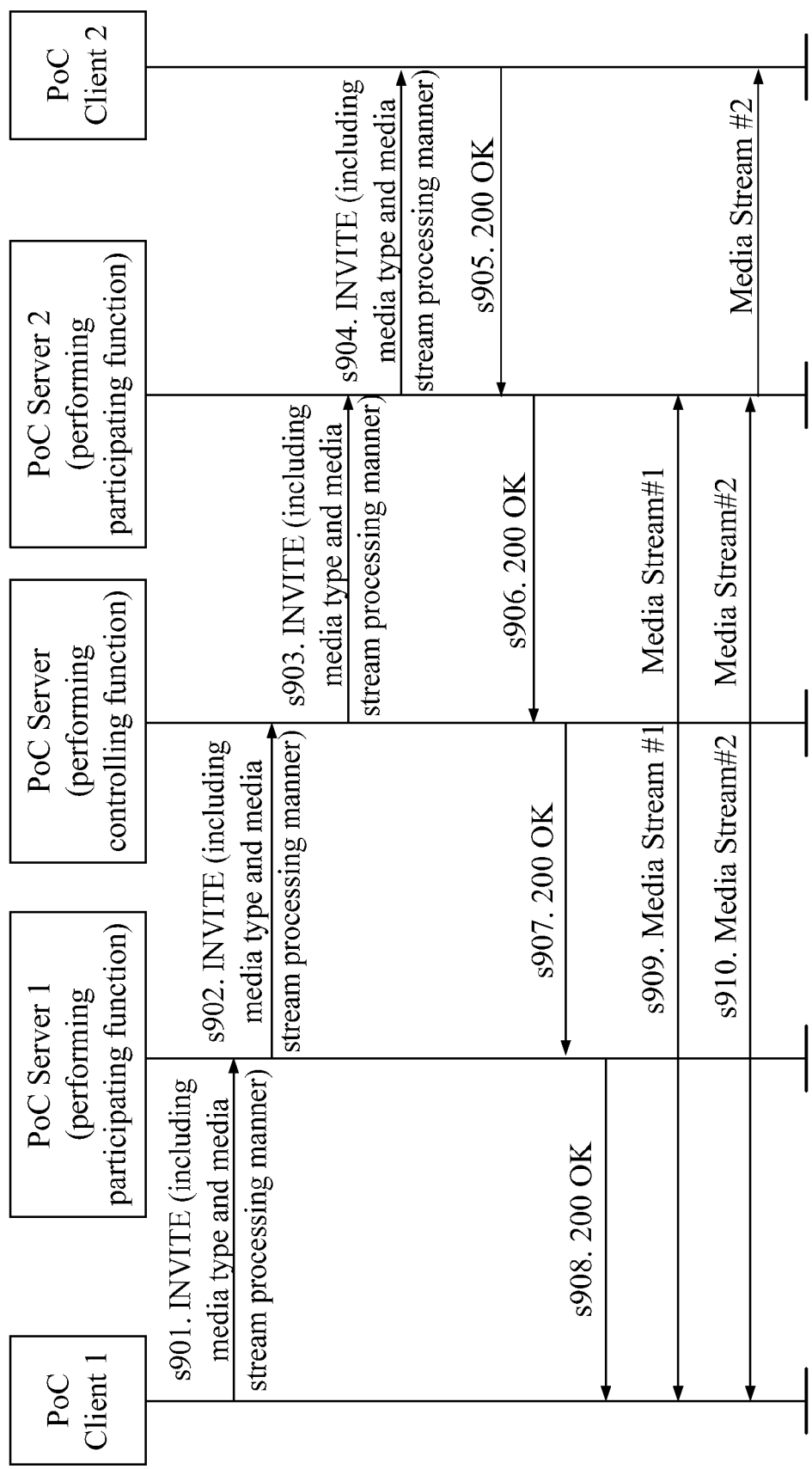
FIG. 9 is a flowchart of a method for the network entity to indicate a manner for processing simultaneous media streams in a created session in the second embodiment of the present invention.

(1) Method for the network entity to indicate a manner for processing of simultaneous media streams during the session As shown in FIG. 9, the method includes the following steps.

Step s901: A first PoC user terminal (PoC Client 1) sends a session invitation request that may carry media parameters (media type and coding parameter) that the user terminal wants to use to join a PoC session and an indication on a manner for processing multiple media streams of the same media type.

Step s902: After receiving the session invitation request, a first PoC Server performing participating function (PoC Server 1) forwards the session invitation request to the PoC Server performing controlling function (PoC Server).

Step s903: After receiving the session invitation request, the PoC Server may obtain a list of other members in the session and the indication on a manner for processing multiple media streams of the same media type in the current session. The PoC Server sends a session invitation request to a second PoC Server performing participating function (PoC Server 2) to which the called second PoC Client (PoC Client 2) belongs. The session invitation request carries the media parameters and indication on a manner for processing multiple media streams of the same media type. In this case, the media stream processing manner is filtering media streams by PoC Server 2.

Step s904: After receiving the session invitation request from the PoC Server, PoC Server 2 forwards the session invitation request to PoC Client 2. At this time, PoC Client 2 obtains the indication on a manner for processing multiple media streams of the same media type. In this case, the media stream processing manner is filtering media streams by the PoC Server to which the user terminal belongs. The user terminal may display the information to the user.

Step s905: PoC Client 2 receives the session invitation request. The PoC user judges whether to join a PoC group session; if so, the PoC user accepts the selected media parameters and sends a 200 OK response indicating the successful acceptance of the session invitation request.

Step s906: After receiving the 200 OK response from PoC Client 2, PoC Server 2 forwards the 200 OK response to the PoC Server.

Step s907: After receiving the 200 OK response, the PoC Server sends a 200 OK response to PoC Server 1 to which PoC Client 1 belongs.

Step s908: After receiving the 200 OK response, PoC Server 1 forwards the 200 OK response to PoC Client 1.

Step s909 to step s910: During the session, the PoC Server sends media stream 1 and media stream 2 of the same media type to PoC Server 1 and PoC Server 2. PoC Server 2 receives media stream 1 and media stream 2 of the same media type, filters media stream 1 by using the media stream processing manner, and sends media stream 2 to PoC Client 2. PoC Server 1 receives media stream 1 and media stream 2 of the same media type, and sends received media stream 1 and media stream 2 of the same media type to PoC Client 2. Then, the user terminal processes the media streams according to the indication on a manner for processing media streams.

In a multiparty session, different network entities may have different manners for processing multiple media streams of the same media type. For example, PoC Server 1 and PoC Server 2 in this embodiment adopt different manners for processing multimedia streams. PoC Server 1 filters media streams directly after receiving the filtering indication; PoC Server 2 sends media stream 1 and media stream 2 to the user terminal without processing after receiving the indication.

Then, the user terminal plays the media to the PoC user according to the indication on a manner for processing multiple media streams of the same media type received during the signaling process.

(2) The network entity processes simultaneous media streams according to the indication on a manner from the user terminal.

Figure 10:
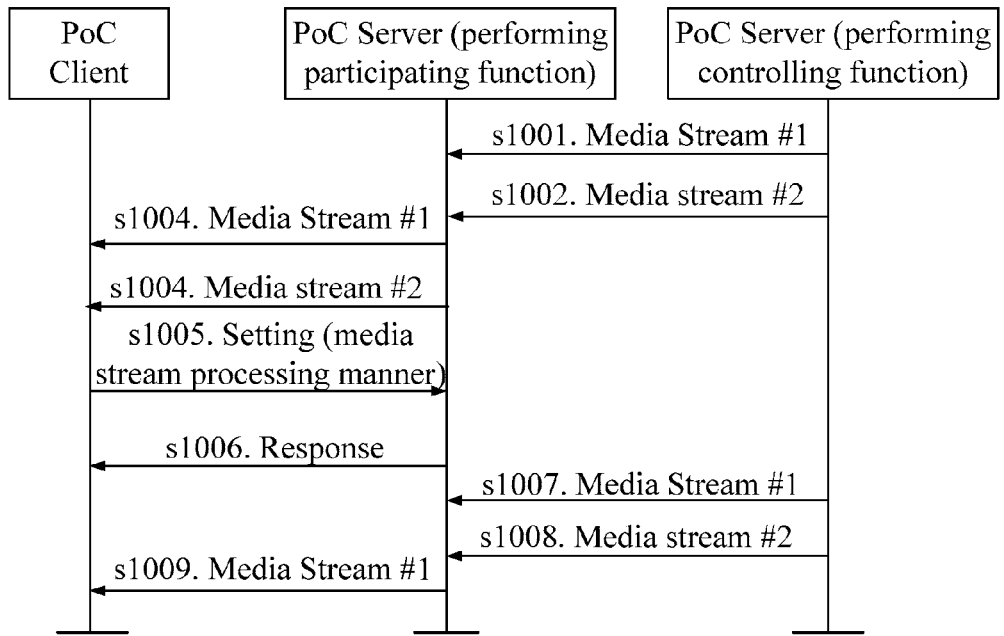
FIG. 10 is a flowchart of a method for the user terminal to indicate a manner in which a server filters media streams in the second embodiment of the present invention.

In this embodiment, the user terminal sends a service setting message to indicate the manner in which the PoC Server performing participating function processes multiple media streams of the same media type. As shown in FIG. 10, the process includes the following steps.

Step s1001 to step s1004: The PoC Server performing controlling function sends media stream 1 and media stream 2 to the user terminal directly through the PoC Server performing participating function.

Step s1005: The user wants the server to modify the media stream processing manner. The user terminal sends a SIP Publish message that carries an indication on a manner for processing media streams to the PoC Server performing participating function.

Step s1006: The PoC Server performing participating function receives the indication on a manner for processing media streams in the service setting, and returns a 200 OK response to the PoC Client.

Step s1007 to step s1009: For media stream 1 and media stream 2 sent from the PoC Server performing controlling function, the PoC Server performing participating function filters media stream 2 and forwards only media stream 1 to the user terminal according to the indication received from the user terminal.

(3) The network entity processes simultaneous media streams according to the indication from the user terminal.

Figure 11:
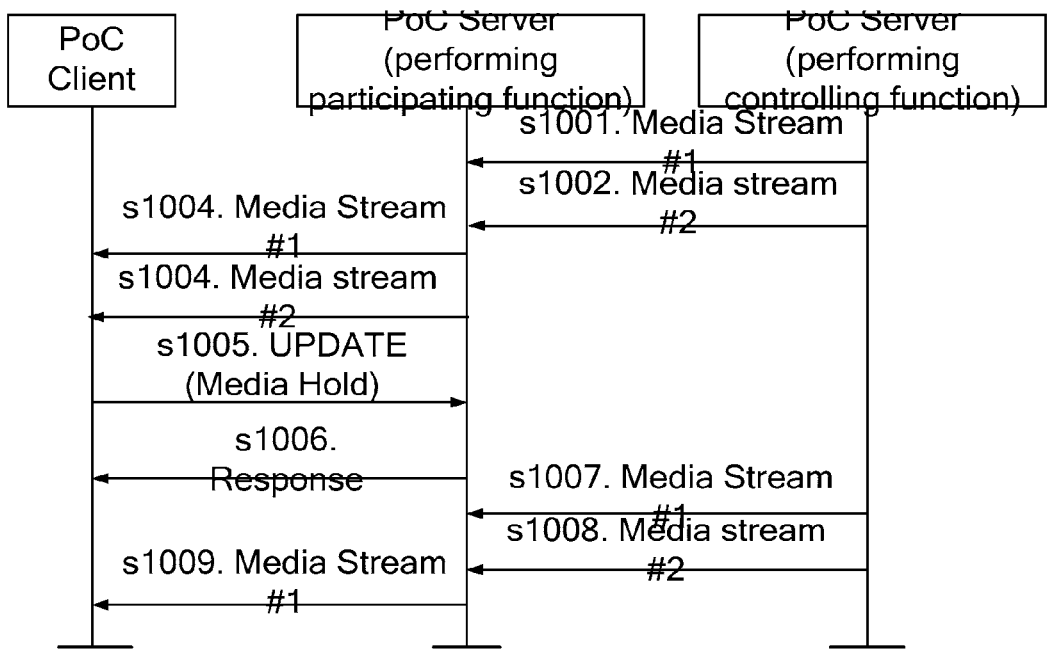
FIG. 11 is a flowchart of a method for the user terminal to indicate a manner in which a server filters media streams in the second embodiment of the present invention.

In this method, the network entity processes simultaneous media streams according to the indication from the user terminal. Compared with the preceding method, this method is implemented in different modes. In this embodiment, the user terminal sends a SIP UPDATE message to indicate the manner in which the PoC Server performing participating function processes media streams of the same media type in the current session. In the SIP UPDATE message, the media parameters described in the SDP protocol describe the media stream processing manner according to the user requirement. For example, the media parameter of a media stream is set to "hold". The message that the user terminal uses to modify the manner for processing media streams on the network entity may be a SIP message such as SIP reINVITE (SIP method). As shown in FIG. 11, the process includes the following steps.

Step s1101 to step s1104: The PoC Server performing controlling function sends media stream 1 and media stream 2 to the user terminal directly through the PoC Server performing participating function.

Step s1105: The user wants the server to modify the media stream processing manner. The user terminal sends a SIP UPDATE message that carries an indication on a manner for processing media streams to the PoC Server performing participating function.

Step s1106: The PoC Server performing participating function receives the indication on a manner for processing media streams in the service setting, and returns a 200 OK response to the PoC Client.

Step s1107 to step s1109: For media stream 1 and media stream 2 sent from the PoC Server performing controlling function, the PoC Server performing participating function filters media stream 2 and forwards only media stream 1 to the user terminal according to the indication on a manner received from the user terminal.

In the preceding description, the PoC Client notifies the PoC Server of the manner for processing media streams by using a control plane signaling method. Certainly, the manner for processing media streams may also be sent by using user plane messages, such as an RTCP message and an extended RTCP message, for example, an MBCP message.

Detailed above are methods for processing simultaneous media streams by the user terminal and the network. In practical applications, these methods may be combined.

The preceding embodiments of the present invention provide a method for processing media streams by the user terminal or by the network after receiving multiple media streams of the same media type. When the user terminal processes the media streams, the user terminal may modify the processing manner according to the user's requirement, without depending on the network entity and with few impacts on the network. The processing manner of the network entity can greatly reduce traffic on the air interface on mobile networks, thus reserving a large quantity of network resources.

Figure 12:
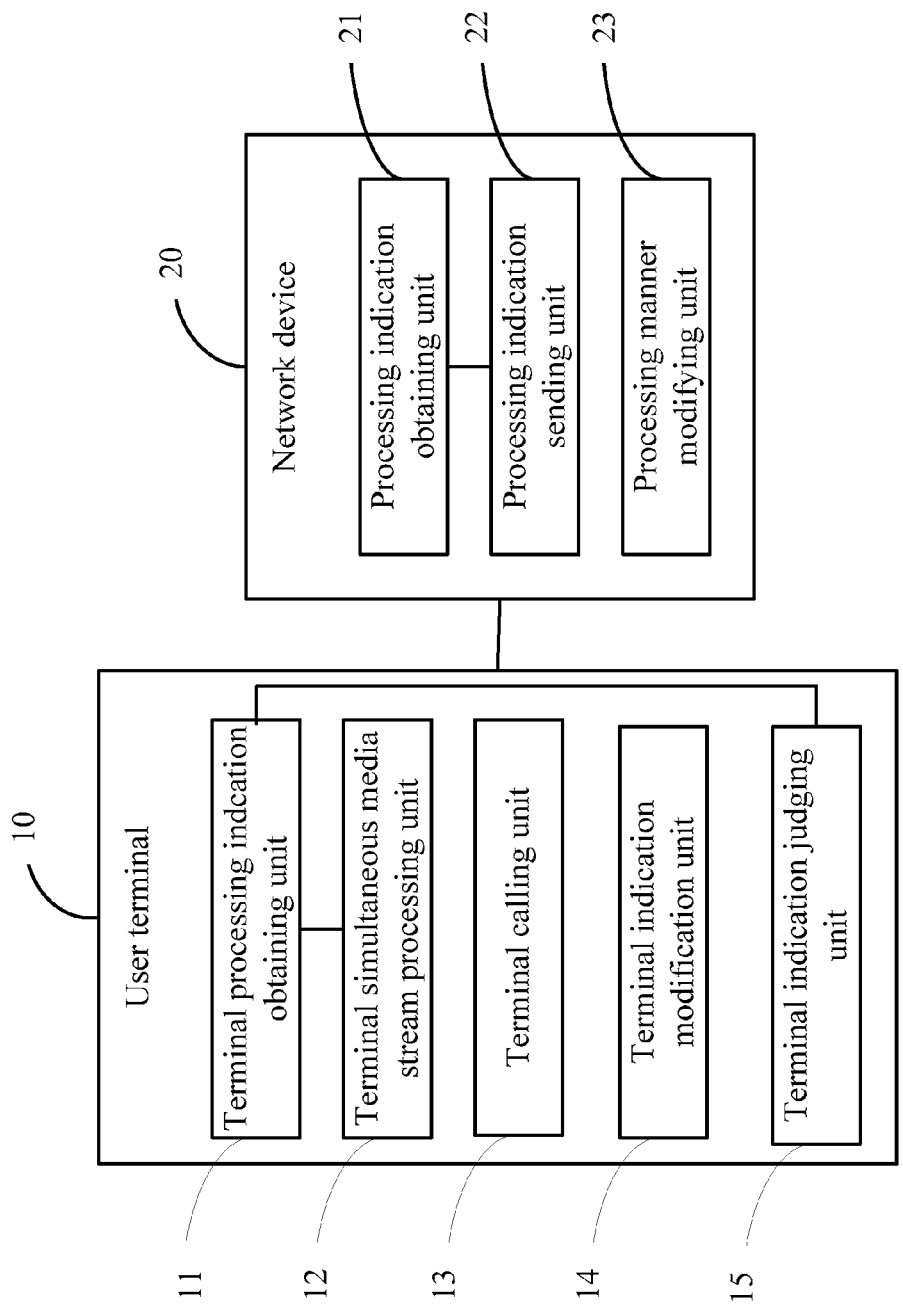
FIG. 12 shows a structure of a system for processing simultaneous media streams in a third embodiment of the present invention.

The third embodiment of the present invention provides a system for processing simultaneous media streams. As shown in FIG. 12, the system includes a user terminal 10 and a network device 20, and is adapted to process simultaneous media streams on the user terminal.

Specifically, the user terminal 10 includes:

a terminal processing indication obtaining unit 11, adapted to obtain an indication on a manner for processing simultaneous media streams;

a terminal simultaneous media streams processing unit 12, adapted to process multiple simultaneous media streams according to the indication obtained by the terminal processing indication obtaining unit 11 when receiving the multiple simultaneous media streams;

a terminal calling unit 13, adapted to initiate a request for calling the session called party to the network when the user terminal 10 functions as the calling party of a group session, where the request carries an indication on a manner for processing the simultaneous media streams;

a terminal indication modification unit 14, adapted to send a first modification message to the network device 20 for modifying the manner for processing simultaneous media streams set at the network; or modify the manner for processing multiple media streams at the user terminal; or modify the manner for processing multiple simultaneous media streams according to a second modification message sent from the network device 20; and a terminal indication judging unit 15, adapted to judge whether to accept the indication on a manner for processing simultaneous media streams obtained by the terminal processing indication obtaining unit 11.

The network device 20 includes:

a processing indication obtaining unit 21, adapted to receive a session message from the user terminal 10, and obtain an indication on a manner for processing simultaneous media streams related to a session specified by the session message;

a processing indication sending unit 22, adapted to send the indication on a manner for processing simultaneous media streams obtained by the processing indication obtaining unit 21 to the user terminal 10; and a processing manner modifying unit 23, adapted to modify the manner for processing simultaneous media streams set by the network according to a first modification message sent from the user terminal 10; or proactively send a second modification message to the user terminal 10 to enable the user terminal 10 to modify the manner for processing simultaneous media streams set by the network.

Figure 13:
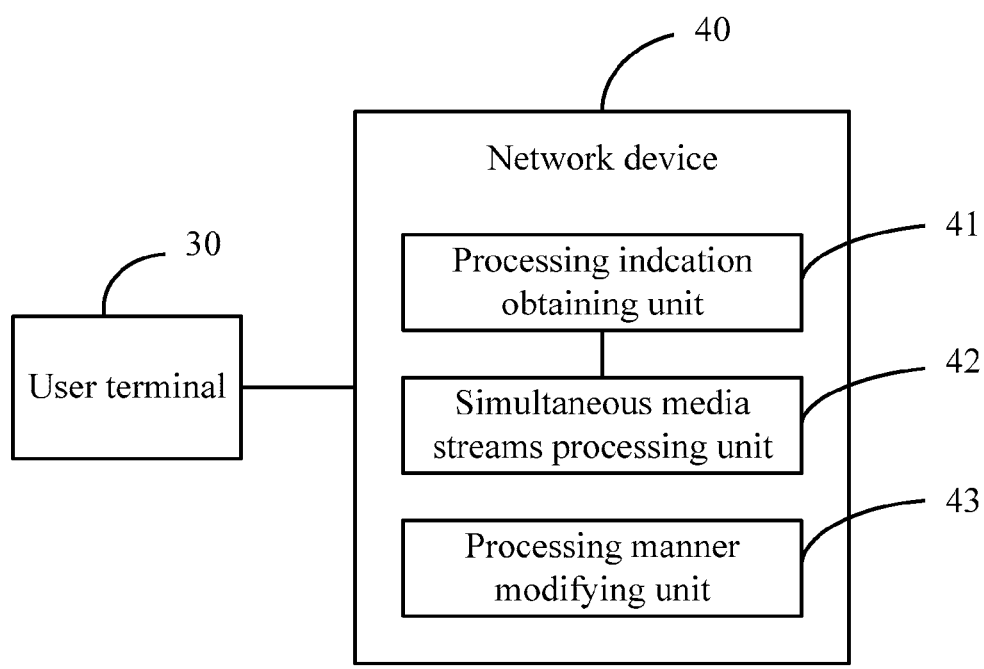
FIG. 13 shows a structure of a system for processing simultaneous media streams in a fourth embodiment of the present invention.

The fourth embodiment of the present invention provides a system for processing simultaneous media streams. As shown in FIG. 13, the system includes a user terminal 30 and a network device 40, and is adapted to process simultaneous media streams on the user terminal.

The network device 40 includes:

a processing indication obtaining unit 41, adapted to obtain an indication on a manner for processing simultaneous media streams when receiving multiple media streams simultaneously sent to the user terminal 30;

a simultaneous media streams processing unit 42, adapted to process the media streams according to the indication obtained by the processing indication obtaining unit 41, and send the processed media streams to the user terminal 30; and a processing manner modifying unit 43, adapted to modify the manner for processing simultaneous media streams set by the network according to the modification message sent from the user terminal 30.

The preceding embodiments of the present invention provide a device for processing media streams by the user terminal or by the network after receiving multiple media streams of the same media type. When the user terminal processes the media streams, the user terminal may modify the processing manner according to the user's requirement, without depending on the network entity and with few impacts on the network. The processing manner of the network entity can greatly reduce traffic on the air interface on mobile networks, thus reserving a large quantity of network resources.

Through the descriptions of the preceding embodiments, those skilled in the art may understand that the present invention may be implemented by hardware only or by software and a necessary universal hardware platform. Based on such understandings, the technical solution under the present invention may be embodied in the form of a software product. The software product may be stored in a nonvolatile storage medium, which can be a compact disk read-only memory (CD-ROM), a USB disk, or a mobile hard disk. The software product includes a number of instructions that enable a computer device (personal computer, server, or network device) to execute the methods provided in the embodiments of the present invention.

Although the present invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall within the scope of protection defined by the claims or their equivalents.

What is claimed is:

1. A method for processing simultaneous media streams, the method comprising:

receiving, by a user terminal, an indication from a network receiving simultaneous media streams from the user terminal, wherein the indication is related to a manner for processing simultaneous media streams of the same media type; and mixing, by the user terminal, all media streams of the simultaneous media streams according to the indication when receiving the simultaneous media streams.

2. The method of claim 1, wherein receiving the indication comprises receiving the indication through an invitation to a PoC Group Session sent by a PoC Server performing controlling function.

3. The method of claim 1, wherein receiving the indication comprises receiving the indication through a response sent by a PoC Server performing controlling function.

4. The method of claim 1, wherein receiving the indication comprises receiving the indication sent by a session calling party and forwarded by a network.

5. The method of claim 1, wherein after mixing the simultaneous media streams, the method further comprises:

sending, by the user terminal, a first modification message to a network, requesting modification to the manner for processing the simultaneous media streams in attributes of a chat group session.

6. The method of claim 1, wherein the simultaneous media streams are processed according to a processing manner ID.

7. The method of claim 1, wherein the media streams are differentiated by different media stream IDs.

8. The method of claim 1, wherein receiving the indication comprises receiving the indication sent by the network according to attribute information of a pre-arranged group session or a chat group session.

9. The method of claim 1, wherein after mixing the simultaneous media streams, the method further comprises modifying, by the user terminal, the manner for processing the simultaneous media streams locally.

10. The method of claim 1, wherein after mixing the simultaneous media streams, the method further comprises modifying, by the user terminal, the manner for processing the simultaneous media streams according to a second modification message sent from the network.

11. A user terminal, comprising:
a terminal processing indication obtaining unit adapted to obtain an indication on a manner for processing simultaneous media streams of the same media type from a network; and
a terminal simultaneous media streams processing unit adapted to receive the simultaneous media streams and mix all media streams of the simultaneous media streams according to the indication obtained by the terminal processing indication obtaining unit.

12. The user terminal of claim 11, further comprising:
a terminal calling unit adapted to send a request for calling a session called party to a network, wherein the request carries the indication on a manner for processing the simultaneous media streams.

13. The user terminal of claim 11, further comprising:
a terminal indication modification unit adapted to send a modification message to a network for modifying the manner for processing simultaneous media streams set at the network, or modify the manner for processing simultaneous media streams at the user terminal.

14. The user terminal of claim 11, further comprising:
a terminal indication judging unit adapted to judge whether to accept the indication on a manner for processing simultaneous media streams obtained by the terminal processing indication obtaining unit.

15. A method for processing simultaneous media streams, the method comprising:
receiving, by a user terminal, an indication from a network, wherein the indication is related to a manner for processing simultaneous media streams of the same media type;
receiving, by the user terminal, simultaneous media streams; and
mixing, by the user terminal, the simultaneous media streams according to a ratio indicated by the indication.

16. A user terminal, comprising:
a terminal processing indication obtaining unit adapted to obtain an indication relating to a manner for processing simultaneous media streams of the same media type from a network; and
a terminal simultaneous media streams processing unit adapted to receive the simultaneous media streams and mix the simultaneous media streams according to a ratio when the terminal processing indication obtaining unit obtains the indication.

\* \* \* \* \*